July 28, 1964     J. E. GUTRIDGE ETAL     3,142,466
STANCHION OPERATING MECHANISM
Filed Nov. 5, 1962     2 Sheets-Sheet 1
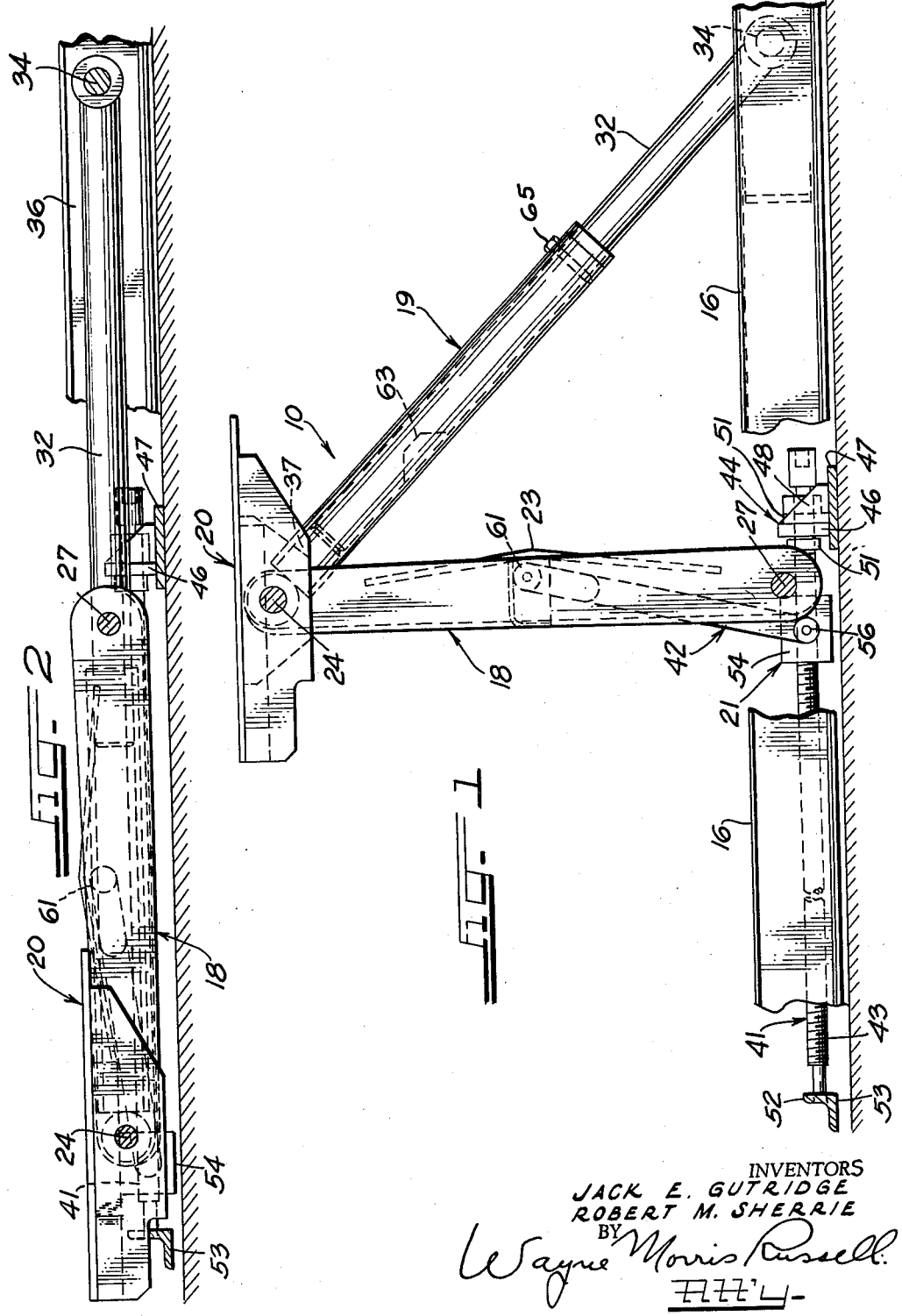
INVENTORS
JACK E. GUTRIDGE
ROBERT M. SHERRIE
BY
Wayne Morris Russell
ATTY.

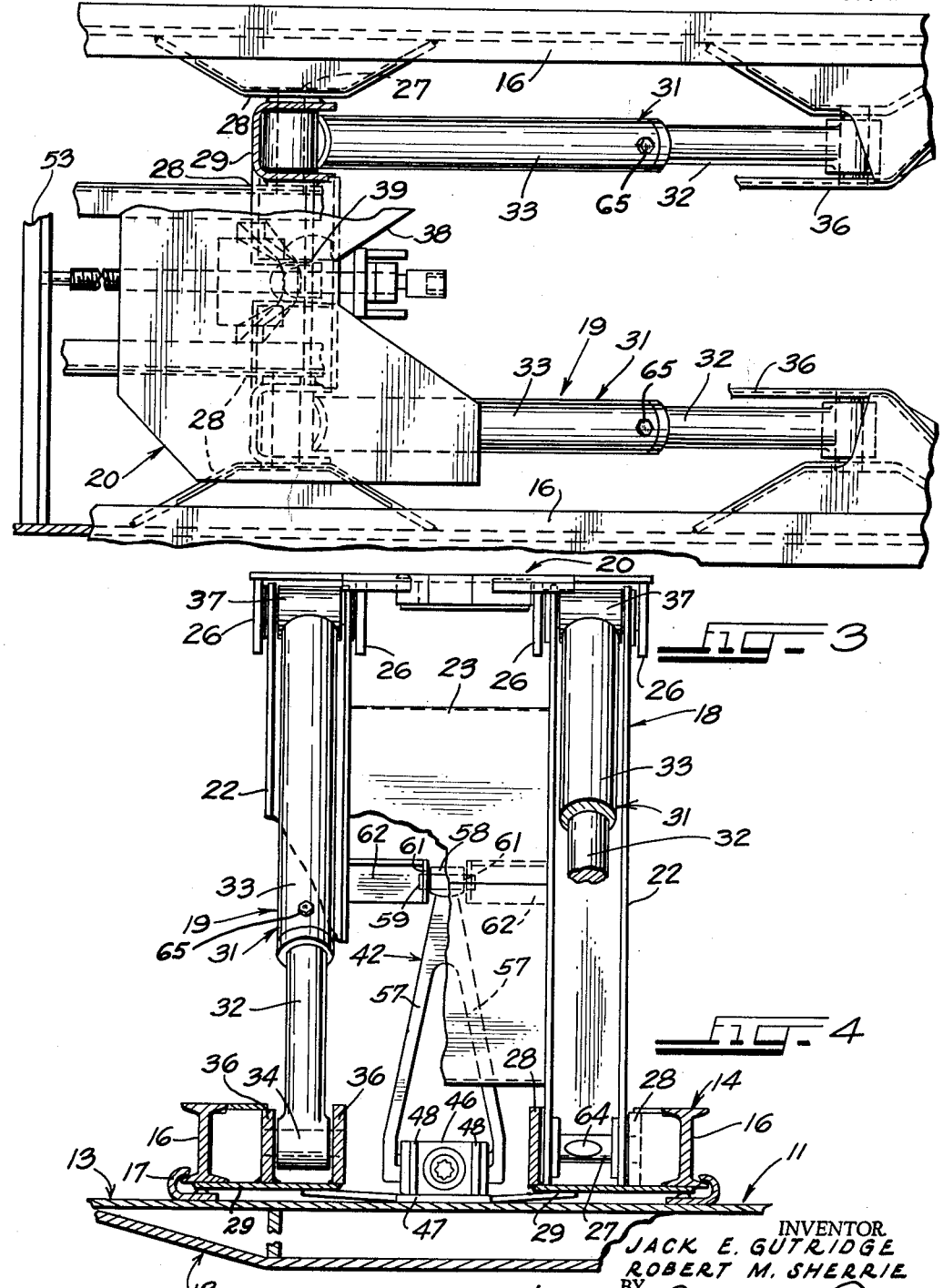

United States Patent Office 3,142,466
Patented July 28, 1964

3,142,466
STANCHION OPERATING MECHANISM
Jack E. Gutridge, Dyer, Ind., and Robert M. Sherrie, Lansing, Ill., assignors to Pullman Incorporated, Chicago, Ill., a corporation of Delaware
Filed Nov. 5, 1962, Ser. No. 235,246
5 Claims. (Cl. 248—119)

The present invention relates to stanchions employed on piggy-back railway vehicles for supporting and hitching the trailers on these vehicles and, more particularly, to a stanchion incorporating a new and improved arrangement for raising and lowering the stanchion between its retracted non-use position adjacent the deck of the vehicle to its raised operative position for engaging the usual trailer kingpin and thereby hitching the trailer on the vehicle.

In the drawings:

FIG. 1 is a side elevation view of the stanchion of the present invention shown in its operative raised position and mounted on a cushion rack type of railway vehicle.

FIG. 2 is a side elevation view of the stanchion shown in its retracted inoperative position.

FIG. 3 is a top plan view of the stanchion in its operative position with some of the parts broken away to show underlying details of the structure.

FIG. 4 is a front elevation view of the stanchion in its operative position with some of the parts being broken away to show underlying details of construction.

Referring now to the drawings, the stanchion 10 of the present invention is illustrated embodied in a railway vehicle 11 of the cushioned rack type. Such cushion rack type railway vehicles generally include an underframe 12 having a deck 13 on which there is mounted for lengthwise movement of the vehicle a rack 14. The rack 14 comprises essentially a pair of transversely spaced I-beams 16 suitably braced along the length thereof by cross members not shown. Guiding the rack 14 on the deck 13 are suitable guide members 17.

For the purpose of absorbing a portion of the impact applied on the couplers of the car there is disposed between the rack 14 and the underframe 12 a suitable cushioning arrangement not shown. Such a cushion arrangement includes a cushioning device having a selective length of travel during which travel the device functions to absorb a portion of the energy of impact so as to protect the lading from damage. In the instant application of the cushion rack the lading would be that carried by the trailer hitched to the rack 14 via the stanchion 10.

In accordance with the present invention the stanchion 10 which serves to hitch the trailer to the vehicle 11 comprises generally an upright strut assembly 18, a diagonal strut assembly 19, a trailer support plate assembly 20, and an elevating assembly 21, which serves to raise and lower the stanchion between its retracted position shown in FIG. 2 to its elevated operative position shown in FIG. 1.

The upright strut assembly 18 includes transversely spaced arm or channel members 22 suitably braced intermediate the ends thereof by a plate 23 secured across the inner legs thereof. The channel members 22 are pivotally connected at their upper ends to the trailer support plate assembly 20 by means of a stud pin 24 fixed to spaced pairs of flanges 26 depending from the underside of the support plate 20.

At their lower ends the channels 22 are each pivotally secured to the rack I-beams 16 by way of a stud pin 27. The stud pins 27 are each mounted in transversely spaced vertical plates fixed as by welding at their lower ends to an inwardly projecting horizontal plate 29 fastened to the underside of the I-beams 16. The outer ones of the vertical plates 28 are bent outwardly and are fixed along their vertical edges to the vertical webs of the I-beams 16.

The diagonal strut assembly 19 includes a pair of transversely spaced legs 31. The legs 31 each include a lower strut member 32 telescopingly disposed within an upper strut member 33. As shown, the lower strut member 32 may be in the form of a solid shaft of substantially circular section. At its lower end the lower strut member 32 is pivotally connected to the rack 14 by way of a stud pin 34 supported between the vertical plates 36 fixed to the I-beams 16 via a horizontal plate 29 and the outer of the plates fixed along its vertical edges to the beam vertical web.

The upper strut member 33 may be a cylinder telescopingly slidable on the shaft 32. Force fitted or otherwise fixed to the other end of the cylinder 33 is a journal member 37 which is pivotally mounted on the stud pin 24 providing the pivoted connection for the channel members 22 of the upright strut assembly 18.

As shown particularly in FIGS. 3 and 4, the members of the diagonal strut assembly 19 are sized so as to be disposed and receivable within the channel members 22. This permits the stanchion to be retracted into a substantially horizontal position as shown in FIG. 2.

The trailer support plate assembly 20 which is merely diagrammatically illustrated may be of more or less conventional construction. Such support plates 20 conventionally include an entry slot 38 communicating with a king pin receiving opening 39 which receive the conventional king pin depending from the underside of the trailer. Disposed within the opening 39 is a king pin latching device (not shown) which upon entry of the king pin through the entry slot and into the opening is actuated to embrace the king pin in locking engagement to firmly hitch the trailer to the car. This latching device is released by a conveniently disposed latch release (not shown) when it is desired to unhitch the trailer upon unloading of the latter.

The stanchion elevating arrangement 21 in accordance with the present invention includes generally a screw device 41 and elevating link 42 connected at one end to the screw device 41 and at its other to the vertical strut assembly 18.

The screw device 41 includes a jack screw member 43 arranged so that its longitudinal axis is substantially parallel to the deck 13, and is transversely disposed intermediate the upright strut channel members 22 and diagonal strut legs 31. Turnably supporting the screw member 43 at its driven end is a support bracket assembly 44 including a vertical and transversely disposed plate 46 fixed to a strap 47 extending between and secured to the I-beams of the rack. Suitable bracing members 48 may be provided to maintain the plate 46 upright. Disposed to engage the opposite faces of plate 46 are stop collars 51. Fixed to the driven end of the screw member 43 is a socket for receiving the driving mechanism which may be a pneumatically driven torque device.

At its other end the screw drive is turnably supported by the vertical leg 52 on an angle member 53 also fixed to the I-beams 16 of the rack 14. Threadably mounted on the screw member intermediate the drive supports 44 and 53 is a pivot block 54 which receives stud pins 56 projecting inwardly from the lower ends of legs 57 of the elevating link 42. The legs 57 of the link 42 are arranged to converge at their upper ends to form a common attachment or journal end 58 which receives a pivot stud 59 fixed to the upright strut assembly 18.

The elevating pivot stud 59 may be mounted at each end in transversely spaced plates 61 fixed to angle or web members 62 extending inwardly of and fixed at one end to the upright strut channel members 22. It is to be observed that the elevating pivot stud 59 is located so that the axial center thereof lies on diagonal strut side of the common center line passing through the support plate pivot pins 24 and the upright strut assembly strut pins 27 for reasons which will be more readily apparent in the following description of the operation of the stanchion.

During loading and unloading of the trailers from the railway vehicle, the stanchion is positioned in its retracted position so that the stanchion 10 is sufficiently clear of the undersides of the tractors employed to haul the trailers on the railway car. In the retracted position as clearly shown in FIG. 2, the upright strut and the diagonal strut assemblies 18 and 19 and support plate assembly 20 each assume a substantially horizontal position substantially parallel to the deck of the vehicle 10. This attitude of the assemblies is made possible by the construction of the upright strut assembly 18 including the channel members 22 which receive the diagonal strut members within the confines thereof. In the retracted position the upper and lower strut members 32 and 33 of the diagonal strut assembly 19 are extended relatively to each other and the solid shaft lower strut member 32 overlies the upright strut assembly's pivot studs 27. In order that the diagonal strut member 19 may assume the substantially horizontal position it may be necessary to provide a cut-out 63 in the shafts 32 located so that in the retracted position of FIG. 2 they overlie a flattened portion 64 in the pivot pins 27.

In the retracted position the pivot block-threaded on the screw drive member is positioned adjacent the upright plate or screw support member 53 so that upon turning of the screw member in a direction causing the pivot block 54 to move to the right as viewed in FIG. 2 the lifting link 42 connected thereto and to the upright strut assembly 18 is operative to raise the stanchion 10. During such raising the upright strut assembly 18 and the diagonal strut assembly 19 turn about their respective pivot studs 27 and 34 which, in the illustrated embodiment, are fixed to the rack 14. Removable locking pins 65 are inserted in aligned transverse openings in the diagonal strut members to lock the same in the raised position of the stanchion.

It is to be noted that in the retracted position of the stanchion 10 the lifting link 42, connected to the stud 59 located on the diagonal strut side of the common center line passing through the centers of the support plate pivot pin 24 and the upright strut pivot pin 27, is inclined upwardly relative to the longitudinal axes of the diagonal and upright strut assemblies 18 and 19 so that movement of the pivot block 54 toward the upright strut pivot pin 27 causes the stanchion to be elevated. Moreover, with the link 42 connected as shown, substantially none of the forces applied by the load of the trailer supported on the support plate 20 are imparted thereto when the stanchion is in its raised operative position.

To lower the stanchion 10 it is merely necessary to turn the screw drive in the opposite direction until the components assume the position shown in FIG. 2.

What is claimed is:

1. In a railway car having a flat open deck portion to receive semi-wheel-supported trailers thereon for piggyback operation, the provision of a retractable stanchion mounted on said deck portion for operation between a vertically upright trailer end supporting position and a horizontally flat storage position, said stanchion in its upright position comprising vertical strut means attached at the base thereof relative to said deck portion by a fixed pivot means and including a trailer support plate assembly pivotally attached to the top portion thereof, said fixed pivot means and the pivotal attachment of said support plate assembly being in at least substantial vertical alignment, diagonal strut means including longitudinally extensible and retractable means having pivotal end connections and extending between the top portion of said vertical strut means and the deck portion in downwardly and longitudinally outwardly inclined relation to said vertical strut means, and stanchion operating means extending longitudinally of said deck portion and including threadedly longitudinally movable means interconnected through link means with said vertical strut means intermediate the base and the top portion of said vertical strut means, opposite end portions of said link means including pivot connections with said longitudinally movable means and said vertical strut means, the pivot connection of said link means with said vertical strut means being located beyond the vertical alignment of said fixed pivot means and the pivotal attachment of said support plate assembly in a direction toward said diagonal strut means in said upright position, the last named pivot connection projecting above the alignment of said fixed pivot means and pivotal attachment of said support plate assembly in the storage position of said stanchion.

2. The railway car of claim 1 wherein said operating means of said stanchion comprises jack screw means having a block means constituting said threadedly longitudinally movable means.

3. The railway car of claim 1 wherein said diagonal strut means of said stanchion includes releasable lock means to prevent retraction thereof in the upright position of said stanchion.

4. The railway car of claim 1 wherein said vertical strut means and said diagonal strut means of said stanchion are each in the form of laterally spaced arm-like members, the pivot connection of said link means with said vertical strut means being carried by transverse web means fixed to the arm-like members of said vertical strut means and extending between the same.

5. The railway car of claim 1 wherein said vertical strut means and said diagonal strut means of said stanchion are each in the form of laterally spaced arm-like members, said operating means being directed centrally between said arm-like members, the pivot connection of said link means with said vertical strut means being carried by transverse web means fixed to the arm-like members of said vertical strut means and extending between the same.

References Cited in the file of this patent

UNITED STATES PATENTS 2,587,067     Sachtleber _____ Feb. 26, 1952

FOREIGN PATENTS 830,410     Great Britain _____ Mar. 16, 1960